(12) United States Patent
Tu et al.

(10) Patent No.: US 11,982,347 B2
(45) Date of Patent: May 14, 2024

(54) VEHICLE ENERGY SAVING CONTROL METHOD, STORAGE MEDIUM, VEHICLE CONTROL SYSTEM, AND VEHICLE

(71) Applicant: Xiamen Yaxon Network Co., Ltd., Fujian (CN)

(72) Inventors: Yankai Tu, Fujian (CN); Chaoyang Huang, Fujian (CN); Xuhui Ye, Fujian (CN); Tengyuan Luo, Fujian (CN)

(73) Assignee: Xiamen Yaxon Network Co., Ltd., Fujian (CN)

( * ) Notice: Subject to any disclaimer, the term of this patent is extended or adjusted under 35 U.S.C. 154(b) by 0 days.

(21) Appl. No.: 18/254,417

(22) PCT Filed: Aug. 6, 2021

(86) PCT No.: PCT/CN2021/111086
§ 371 (c)(1),
(2) Date: May 25, 2023

(87) PCT Pub. No.: WO2022/134603
PCT Pub. Date: Jun. 30, 2022

(65) Prior Publication Data
US 2024/0102553 A1    Mar. 28, 2024

(30) Foreign Application Priority Data

Dec. 21, 2020  (CN) .......................... 202011514486.2

(51) Int. Cl.
*F16H 61/02*    (2006.01)
*F16H 59/44*    (2006.01)
(Continued)

(52) U.S. Cl.
CPC ......... *F16H 61/0213* (2013.01); *F16H 59/44* (2013.01); *F16H 59/52* (2013.01);
(Continued)

(58) Field of Classification Search
CPC ...... F16H 61/0213; F16H 59/44; F16H 59/52; F16H 59/66; F16H 59/70; F16H 2059/666
See application file for complete search history.

(56) References Cited

U.S. PATENT DOCUMENTS 10,000,214 B2 *  6/2018  Puri .................... B60W 40/076
10,042,815 B2 *  8/2018  Yu ............................. B60T 8/24
(Continued)

FOREIGN PATENT DOCUMENTS

CN         101392691 A         3/2009
CN         101432176 A         5/2009
(Continued)

OTHER PUBLICATIONS

International Search Report cited in PCT/CN2021/111086 mailed Nov. 10, 2021, 8 pages.
(Continued)

*Primary Examiner* — Tinh Dang
(74) *Attorney, Agent, or Firm* — Cooper Legal Group, LLC

(57) ABSTRACT

Disclosed in the present disclosure is a vehicle energy saving control method, comprising: switching a multi-power switch to a corresponding gear position according to an actual load value and a load threshold; obtaining road information of a corner ahead when the vehicle is driving, wherein the road information comprises a curvature radius; calculating equivalent mass according to the curvature radius, total mass, a speed of the vehicle and a road friction coefficient; determining a predicted gear position according to the sum of the actual load value and the equivalent mass; and switching the multi-power switch to the predicted gear position if the predicted gear position is different from the current gear position. The present disclosure can solve the (Continued)

problem of energy waste caused by the power output mismatch when the vehicle passes the corner.

7 Claims, 3 Drawing Sheets

(51) Int. Cl.
    *F16H 59/52*     (2006.01)
    *F16H 59/66*     (2006.01)
    *F16H 59/70*     (2006.01)

(52) U.S. Cl.
    CPC ............. *F16H 59/66* (2013.01); *F16H 59/70* (2013.01); *F16H 2059/666* (2013.01)

(56) References Cited

U.S. PATENT DOCUMENTS

| | | | | |
|---|---|---|---|---|
| 10,071,742 | B2* | 9/2018 | Hall | B60L 3/12 |
| 10,124,806 | B2* | 11/2018 | Raffone | B60T 8/172 |
| 10,166,980 | B2* | 1/2019 | Fujii | B60W 30/09 |
| 10,408,668 | B2* | 9/2019 | Park | F16H 63/40 |
| 2011/0106388 | A1* | 5/2011 | Boeckenhoff | B60W 10/06 |
| | | | | 701/70 |

FOREIGN PATENT DOCUMENTS

| | | |
|---|---|---|
| CN | 201301754 Y | 9/2009 |
| CN | 102632890 A | 8/2012 |
| CN | 104343552 A | 2/2015 |
| CN | 104627185 A | 5/2015 |
| CN | 101392691 B | 2/2016 |
| CN | 105332805 A | 2/2016 |
| CN | 106677913 A | 5/2017 |
| CN | 107842604 A | 3/2018 |
| CN | 109715920 A | 5/2019 |
| CN | 110962595 A | 4/2020 |
| CN | 111114343 A | 5/2020 |
| CN | 111173924 A | 5/2020 |
| CN | 112728068 A | 4/2021 |
| DE | 102018210715 A1 | 1/2020 |
| JP | 03258934 A | 11/1991 |

OTHER PUBLICATIONS

Written Opinion cited in PCT/CN2021/111086 mailed Nov. 10, 2021, 4 pages.

* cited by examiner

VEHICLE ENERGY SAVING CONTROL METHOD, STORAGE MEDIUM, VEHICLE CONTROL SYSTEM, AND VEHICLE

TECHNICAL FIELD

The present disclosure relates to the technical field of vehicle control, and in particular to a vehicle energy saving control method, storage medium, vehicle control system and vehicle.

BACKGROUND

Commercial vehicle has a large variable range of load. For a full load state and a no-load state, vehicle load difference can reach dozens of tons. Therefore, most engines of commercial vehicles adopt a method of multi-gear power/torque and load matching to achieve energy saving control. For example, the Chinese published patent with the publication number CN201301754Y discloses a switch that can manually switch engine power; the Chinese granted patent with the publication number CN101392691B discloses a method of matching light duty and heavy duty power levels with vehicle loads; and the Chinese published patent CN105332805A further discloses a method of using a load sensor to automatically match the corresponding power level according to the current load.

However, most of these traditional methods measure the load of the vehicle itself, and then switch the gear position of the corresponding vehicle multi-power level transfer switch (hereinafter referred to as multi-power switch). There are the following limitations: continuously changing external road conditions are not taken into account, especially a turning resistance of the vehicle under the condition of a corner, which would be converted into a load factor of the vehicle. For example, for the light-loaded vehicle, in a sharp turn, because a lateral turning resistance should be overcome, it is equivalent to increasing the load for an engine. Therefore, it is possible that a power output of the current engine better matches a power output gear position of the half-load or heavy-load.

In the Chinese published patent with the publication number CN106677913A "Power and Load Matching Control Method, Device, System and Transport Vehicle", a method of using an angle sensor to measure terrain and integrating measurement results of load sensor to correspond to the power level is disclosed. But this method does not consider the resistance of the corner.

In addition, for the vehicle multi-power switch, from being switched to being actually effective, generally there is a certain delay. Because the road is constantly changing, the switch of the multi-power switch is constantly occurring in the running of the vehicle. If the multi-power switch is not switched in advance, the power gear position during the switch delay does not match the road situation, which not only does not save fuel but also causes the cost of fuel.

SUMMARY

Technical Problem

The technical problem to be solved by the present disclosure is to provide a vehicle energy saving control method, storage medium, vehicle control system and vehicle, which can solve the problem of energy waste caused by power output mismatch when the vehicle passes a corner.

Technical Solution

In order to solve the above technical problem, the present disclosure adopts the following technical solution: a vehicle energy saving control method, comprising:
obtaining a load threshold corresponding to each gear position of a multi-power switch;
obtaining an actual load value by a load sensor when the vehicle starts;
determining a corresponding gear position according to the actual load value and the load threshold, and switching the multi-power switch to the corresponding gear position;
obtaining road information ahead of the vehicle when the vehicle is driving, wherein the road information comprises a curvature radius of a corner ahead of the vehicle;
calculating equivalent mass according to the curvature radius, total mass of the vehicle, a speed of the vehicle and a preset road friction coefficient;
determining a predicted gear position according to the sum of the actual load value and the equivalent mass; and
switching the multi-power switch to the predicted gear position if the predicted gear position is different from the current gear position.

The present disclosure also provides a computer readable storage medium having a computer program stored thereon, wherein the computer program, when being executed by a processor, implements the steps of the method described above.

The present disclosure also provides a vehicle control system which comprises a power transfer switch controller, an engine ECU, a load sensor and a map module, wherein the map module is an electronic horizon system or a navigation map, the power transfer switch controller is connected with the engine ECU, the load sensor and the map module respectively, and the power transfer switch controller has a computer program stored thereon, wherein the computer program, when being executed by a processor, implements the steps of the method described above.

The present disclosure also provides a vehicle comprising the vehicle control system as described above.

Beneficial Effects

The beneficial effects of the present disclosure are as follows: increased equivalent mass is calculated to overcome resistance of the corner when the vehicle passes the corner by obtaining the curvature radius of the corner ahead of the vehicle and according to road information and vehicle information; thus, the predicted gear position of the vehicle when the vehicle passes the corner can be determined again, so that the power can be matched with the environment when the vehicle passes the corner, and the fuel saving effect can be achieved. The present disclosure can solve the problem of energy waste caused by the power output mismatch when the vehicle passes the corner.

DESCRIPTION OF REFERENCE NUMBERS

1. Power transfer switch controller; 2. Engine ECU; 3. Load sensor; 4. Map module.

DESCRIPTION OF EMBODIMENTS

In order to explain the technical content, purpose and effects of the present disclosure in detail, the following are described in combination with the implementations with reference to the accompany drawings.

Figure 1:
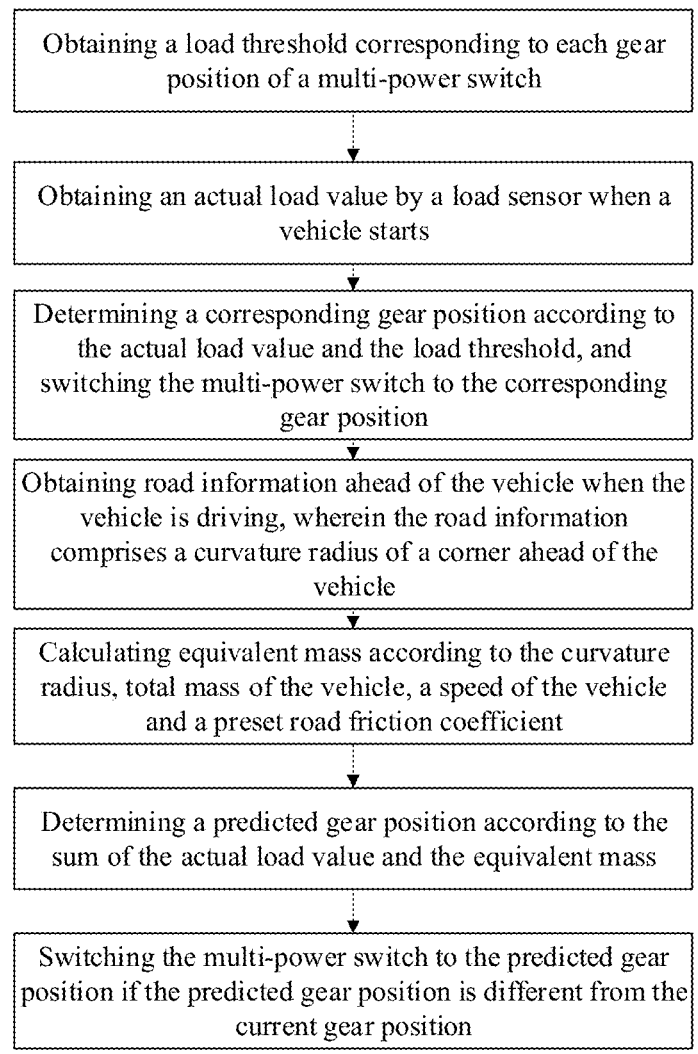
FIG. 1 is a flow chart of a vehicle energy saving control method of the present disclosure.

Please refer to FIG. 1, a vehicle energy saving control method, comprising:
- obtaining a load threshold corresponding to each gear position of a multi-power switch;
- obtaining an actual load value by a load sensor when the vehicle starts;
- determining a corresponding gear position according to the actual load value and the load threshold, and switching the multi-power switch to the corresponding gear position;
- obtaining road information ahead of the vehicle when the vehicle is driving, wherein the road information comprises a curvature radius of a corner ahead of the vehicle;
- calculating equivalent mass according to the curvature radius, total mass of the vehicle, a speed of the vehicle and a preset road friction coefficient;
- determining a predicted gear position according to the sum of the actual load value and the equivalent mass; and
- switching the multi-power switch to the predicted gear position if the predicted gear position is different from the current gear position.

From the above description, it can be seen that the beneficial effects of the present disclosure are as follows: the problem of energy waste caused by the power output mismatch when the vehicle passes the corner can be solved.

Further, the step of determining a corresponding gear position according to the actual load value and the load threshold, and switching the multi-power switch to the corresponding gear position specifically comprises:
- comparing, by the power transfer switch controller, the actual load value with the load threshold value, so as to determine the gear position corresponding to the actual load value, and to send the corresponding gear position to an engine ECU; and
- switching the multi-power switch to the gear position after the corresponding gear position is received by the engine ECU.

The step of obtaining road information ahead of the vehicle specifically comprises:
- obtaining a current position of the vehicle through a positioning system; and
- obtaining the road information ahead of the vehicle through a navigation map or an electronic horizon system based on the current position of the vehicle.

Further, the step of calculating equivalent mass according to the curvature radius, total mass of the vehicle, a speed of the vehicle and a preset road friction coefficient specifically comprises:
- calculating the equivalent mass according to a first formula, wherein the first formula is $\Delta m=(mv^2)/(g\mu r)$, $\Delta m$ is the equivalent mass, m is the total mass of the vehicle, v is the speed of the vehicle, g is the gravity angular velocity, $\mu$ is the preset road friction coefficient, and r is the curvature radius of the corner ahead of the vehicle.

It can be seen from the above description that the extra resistance to be overcome when the vehicle passes the corner is converted into the load resistance to be overcome, that is, the centripetal force to be overcome when the vehicle passes the corner is converted into the road friction resistance overcome by the equivalent mass. Therefore, the first formula can be obtained according to the centripetal force formula and the formula of the friction resistance overcome by the equivalent mass. The equivalent mass increased by overcoming the resistance of the corner is solved when the vehicle passes the corner.

Further, a real-time distance between a current position of the vehicle and the corner ahead is obtained in real time, and a first distance is calculated in real time according to a real-time speed of the vehicle and power gear position switching time; and
- if the real-time distance and the first distance corresponding to a same time are equal, taking the real-time speed of the vehicle at the same time as the speed of the vehicle v in the first formula.

Further, the step of switching the multi-power switch to a predicted gear position specifically comprises:
- when a real-time distance between the current position of the vehicle and the corner ahead is equal to a first distance, switching the multi-power switch to the predicted gear position, wherein the first distance is calculated according to a second formula which is S=vT, wherein S is the first distance, v is a real-time speed of the vehicle, and T is power gear position switching time.

It can be seen from the above description, the gear position switching operation of the multi-power switch is performed in advance, which can ensure to switch to the gear position required for passing the corner before or when entering the corner, so as to achieve a more accurate energy-saving effect.

The present disclosure also provides a computer readable storage medium having a computer program stored thereon, wherein the computer program, when being executed by a processor, implements the steps of the method described above.

Figure 2:
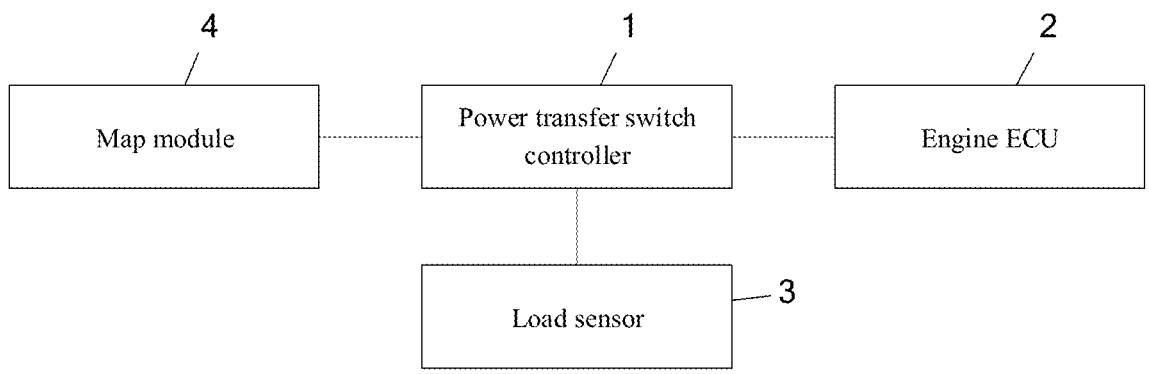
FIG. 2 is a structural schematic diagram of a vehicle control system of the present disclosure.

Please refer to FIG. 2, the present disclosure also provides a vehicle control system which comprises a power transfer switch controller 1, an engine ECU2, a load sensor 3 and a map module 4, wherein the map module 4 is an electronic horizon system or a navigation map, the power transfer switch controller 1 is connected with the engine ECU2, the load sensor 3 and the map module 4 respectively, and the power transfer switch controller 1 has a computer program stored thereon, wherein the computer program, when being executed by a processor, implements the steps of the method described above.

The present disclosure also provides a vehicle comprising the vehicle control system as described above.

A First Embodiment

Figure 3:
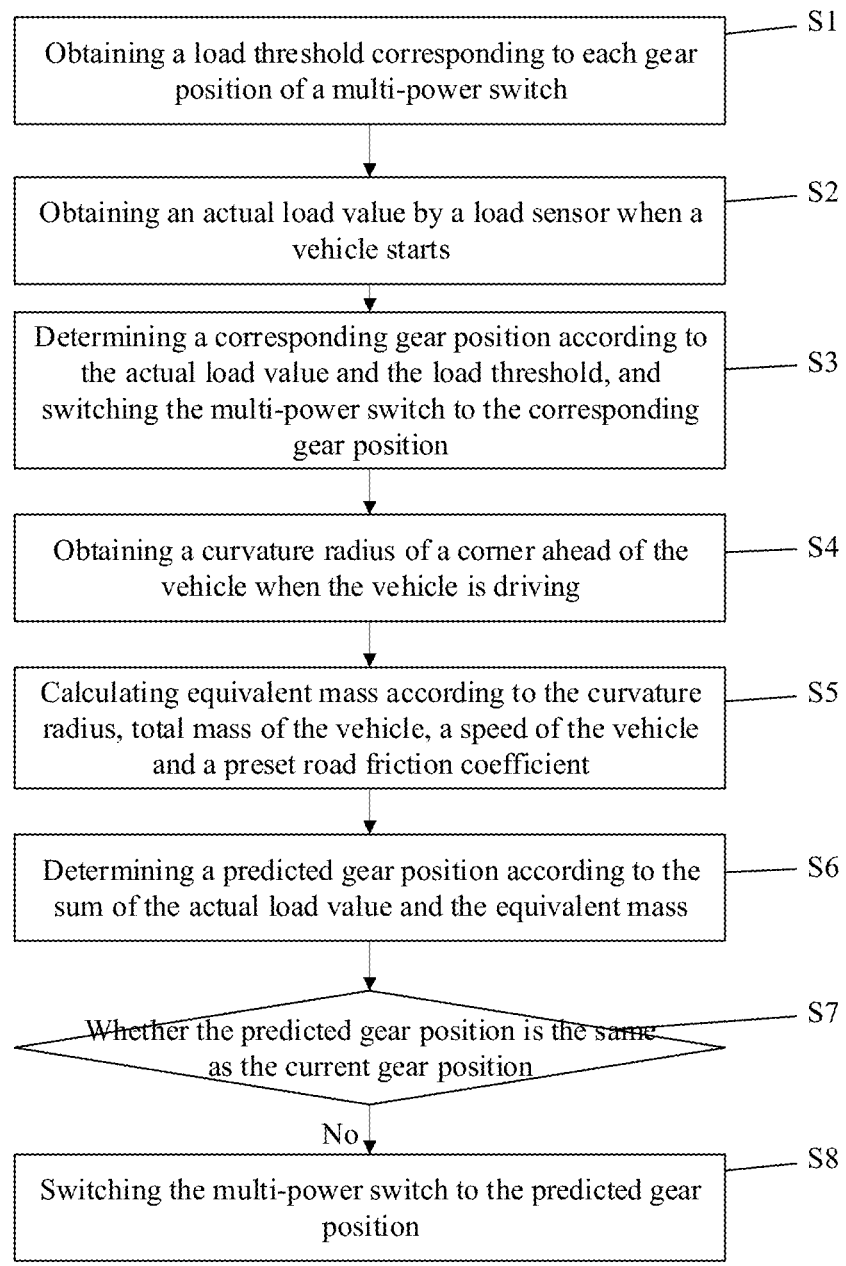
FIG. 3 is a flow chart of a method in a first embodiment of the present disclosure.

Please refer to FIG. 3 and FIG. 4, the first embodiment of the present disclosure is as follows: a vehicle energy saving control method, which is based on corner prediction and can be applied to the vehicle control system, as shown in FIG. 3, wherein the method comprises the following steps:

S1: obtaining a load threshold corresponding to each gear position of a multi-power switch in a default state.

In the default state, the gear positions of the existing multi-power switch are classified according to the load value of a level road. Assuming that there are N gear positions in the multi-power switch, there are N−1 load thresholds, which are $P_1, P_2, P_3, \ldots, P_{N-1}$ respectively.

S2: obtaining an actual load value by a load sensor when the vehicle starts, that is, obtaining the current load value.

S3: determining a corresponding gear position according to the actual load value and the load threshold, and switching the multi-power switch to the corresponding gear position.

Specifically, comparing, by the power transfer switch controller, the actual load value with the load threshold value, so as to determine the gear position corresponding to the actual load value, and to send the gear position to an engine ECU; and the engine ECU switches the multi-power switch to the gear position after receiving the gear position.

S4: obtaining road information ahead of the vehicle when the vehicle is driving, wherein the road information comprises a curvature radius of a corner ahead of the vehicle.

Specifically, obtaining a current position of the vehicle through a positioning system; and obtaining the road information ahead of the vehicle through a navigation map or an electronic horizon system based on the current position of the vehicle. Preferably, the road information comprises a curvature radius of a corner closest to and ahead of the vehicle.

Further, since the curvature radiuses of different road points in the same corner are generally different, a curvature radius of a corner point closest to and ahead of the vehicle can be obtained in real time.

S5: calculating equivalent mass according to the curvature radius, total mass of the vehicle, a speed of the vehicle and a preset road friction coefficient.

Since the vehicle needs to overcome additional turning resistance when the vehicle passes the corner, this part of the turning resistance can be converted to the load resistance to be overcome. The essence of the turning resistance to be overcome is the centripetal force $Fc=mv^2/r$ when passing the corner, where m represents the total mass of the vehicle (empty vehicle mass+cargo weight) and can be obtained by the load sensor, v is the speed of the vehicle, and r is the curvature radius of the corner ahead of the vehicle.

The overcome centripetal force Fc is converted into the road friction resistance Fr overcome by the equivalent mass. Assuming that the equivalent mass is $\Delta m$, the friction resistance overcome by the equivalent mass is $Fr=\Delta mg\,\mu$, where g is the standard acceleration constant of gravity and $\mu$ is the road friction coefficient. Each of the road of cement and the road of asphalt corresponds to a road friction coefficient, which can be determined according to the current road material.

Therefore, Fc=Fr, that is, $mv^2/r=\Delta mg\,\mu$. The first formula $\Delta m=(mv^2)/(g\mu r)$ can be obtained by sorting. That is, the predicted extra resistance to be overcome when passing the corner ahead is equivalent to adding $\Delta m$ to the vehicle's load when driving on a straight road.

S6: determining a predicted gear position according to the sum of the actual load value and the equivalent mass; that is, comparing the sum of the actual load value and equivalent mass with the load threshold to determine the corresponding gear position as the predicted gear position.

S7: judging whether the predicted gear position is the same as the current gear position, wherein if so, it indicates that the gear position of the multi-power switch does not need to be changed when passing the corner ahead; and, if not, it indicates that the gear position of the multi-power switch needs to be changed when passing the corner ahead so as to ensure that the power matches the environment and achieve more fuel saving effect and step S8 is performed.

S8: switching the multi-power switch to the predicted gear position.

Further, assuming that time from the start of a gear position switching action to the realization of power gear position switching after the engine receives the signal is T (generally millisecond level); and the real-time speed of the vehicle is v. When the real-time distance D between the current position of the vehicle and the corner ahead obtained from the electronic horizon is equal to the first distance (i.e., the first distance S=vT) calculated according to the current speed of the vehicle and the time T of power gear position switching, calculating the equivalent mass according to the current speed v of the vehicle, determining the predicted gear position, and performing the operation of switching to the predicted gear position, i.e., performing the steps S5-S8.

Further, since the electronic horizon system sends geographical information outward (multi-power switch gear position controller) in a form of continuous points and attributes of points ahead of the road, the information form is geographical element data combined with a road offset.

Figure 4:
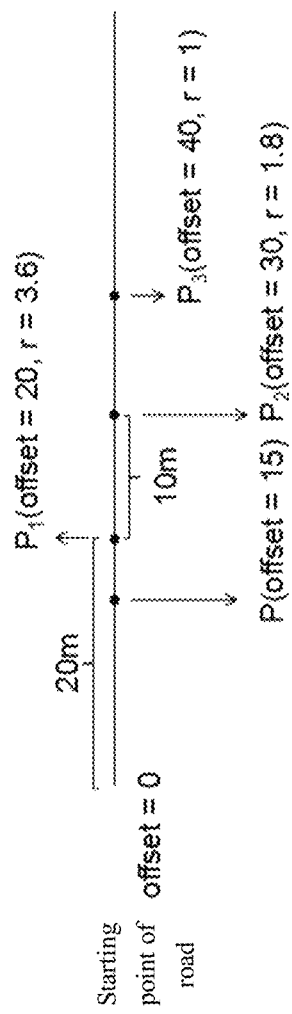
FIG. 4 is a schematic diagram of the current position of a vehicle and the information of the corner point ahead of the vehicle in the first embodiment of the present disclosure.

For example, refer to FIG. 4, which shows the current position point P of the vehicle and three consecutive points P1, P2 and P3 of the continuous bending degree data (curvature radius) of the road ahead of the vehicle output by the electronic horizon system. Wherein P1, P2 and P3 may be considered as continuous points on a complete corner by tradition, and no curvature radius of corner is continuously fixed. Therefore, the curvature radius values of different road points on a general corner also change continuously but are not the same.

The road points P1, P2 and P3 are represented in the electronic horizon system by the offset value from the road starting point and the corresponding curvature radius r. The road corner ahead broadcasted by the electronic horizon system is consisted of a series of information points with continuous short distances and equal intervals of K meters (such as 10 meters). The vehicle position P is also converted by the electronic horizon system to offset from the road starting point. For example, the offset of the vehicle position P in this example is equal to 15. According to the electronic horizon information, it can be known that the distance between the current position of the vehicle and the next P1 point is D=20−15=5 meters.

The offset of the vehicle position P is constantly updated as the vehicle drives. By calculating the offset difference, the real-time distance D between the current position P of the vehicle and the corner point of P1 ahead can be obtained continuously from the electronic horizon as described above. At the same time, the first distance can be calculated in real time by the second formula S=vT according to the real-time speed of the vehicle. When the real-time distance D=the first distance S, the current speed v of the vehicle is substituted into the first formula mentioned above to calculate $\Delta m$ and perform the following steps (since T is very small, the vehicle has been very close to point P1 at this time, and the speed of v is approximate to the speed when reaching point P1).

Similarly, when the vehicle passes point P1 and starts to approach point P2, the real-time distance D between the current position of the vehicle and the corner point of P2 ahead is constantly obtained from the electronic horizon as described above, and the first distance is calculated by the second formula S=vT according to the real-time speed of the vehicle. When the real-time distance D=the first distance S, the current speed v of the vehicle is substituted into the first formula mentioned above to calculate Δm and perform the following steps. In this way, the curvature radius of each corner point ahead of the vehicle can be obtained in real time according to the electronic horizon information when the vehicle is driving, and the gear position can be calculated and changed in real time.

Further, when the vehicle is driving, the curvature radius of the road point ahead of the vehicle is obtained in real time and calculated in real time to determine whether to change the gear position, that is, repeat the steps S4-S8 (at this time, the curvature radius of the road point ahead of the vehicle is obtained in real time in step S4). As the curvature radius r of a straight line is infinite, it is represented by a maximum value in the electronic horizon system. From the first formula, it can be seen that when r in the denominator is infinite, Δm=0, so it is equivalent to no superimposed equivalent mass. Therefore, continue to perform steps S4-S8 even when there is no corner ahead during the driving.

In this embodiment, the curvature radius of the corner ahead of the vehicle is obtained through the use of the navigation map or electronic horizon system, and the increased equivalent mass is calculated when the vehicle passes the corner according to road information and vehicle information; thus, the predicted gear position of the vehicle when the vehicle passes the corner can be determined again, so that the power can be matched with the environment when the vehicle passes the corner, and the fuel saving effect can be achieved. The gear position switching operation of the multi-power switch is performed in advance, which can ensure to switch to the gear position required for passing the corner before or when entering the corner, so as to achieve a more accurate energy-saving effect.

A Second Embodiment

This embodiment corresponds to the above embodiment and provides a computer readable storage medium having a computer program stored thereon, wherein the computer program, when being executed by a processor, implements the following steps:
  obtaining a load threshold corresponding to each gear position of a multi-power switch;
  obtaining an actual load value by a load sensor when the vehicle starts;
  determining a corresponding gear position according to the actual load value and
  the load threshold, and switching the multi-power switch to the corresponding gear position;
  obtaining road information ahead of the vehicle when the vehicle is driving, wherein the road information comprises a curvature radius of a corner ahead of the vehicle;
  calculating equivalent mass according to the curvature radius, total mass of the vehicle, a speed of the vehicle and a preset road friction coefficient;
  determining a predicted gear position according to the sum of the actual load value and the equivalent mass; and
  switching the multi-power switch to the predicted gear position if the predicted gear position is different from the current gear position.

Further, the step of determining a corresponding gear position according to the actual load value and the load threshold, and switching the multi-power switch to the corresponding gear position specifically comprises:
  comparing, by the power transfer switch controller, the actual load value with the load threshold value, so as to determine the gear position corresponding to the actual load value, and to send the corresponding gear position to an engine ECU; and
  switching the multi-power switch to the gear position after the corresponding gear position is received by the engine ECU.

The step of obtaining road information ahead of the vehicle specifically comprises:
  obtaining a current position of the vehicle through a positioning system; and
  obtaining the road information ahead of the vehicle through a navigation map or an electronic horizon system based on the current position of the vehicle.

Further, the step of calculating equivalent mass according to the curvature radius, total mass of the vehicle, a speed of the vehicle and a preset road friction coefficient specifically comprises:
  calculating the equivalent mass according to a first formula, wherein the first formula is $\Delta m=(mv^2)/(g\mu r)$, $\Delta m$ is the equivalent mass, m is the total mass of the vehicle, v is the speed of the vehicle, g is the gravity angular velocity, $\mu$ is the preset road friction coefficient, and r is the curvature radius of the corner ahead of the vehicle.

Further, a real-time distance between a current position of the vehicle and the corner ahead is obtained in real time, and a first distance is calculated in real time according to a real-time speed of the vehicle and power gear position switching time; and
  if the real-time distance and the first distance corresponding to a same time are equal, taking the real-time speed of the vehicle at the same time as the speed of the vehicle v in the first formula.

Further, the step of switching the multi-power switch to a predicted gear position specifically comprises:
  when a real-time distance between a current position of the vehicle and the corner ahead is equal to a first distance, switching the multi-power switch to the predicted gear position, wherein the first distance is calculated according to a second formula which is S=vT, wherein S is the first distance, v is a real-time speed of the vehicle, and T is power gear position switching time.

In summary, provided in the present disclosure are a vehicle energy saving control method, storage medium, vehicle control system and vehicle, wherein the curvature radius of the corner ahead of the vehicle is obtained through the use of the navigation map or electronic horizon system, and the increased equivalent mass is calculated when the vehicle passes the corner according to road information and vehicle information; thus, the predicted gear position of the vehicle when the vehicle passes the corner can be determined again, so that the power can be matched with the environment when the vehicle passes the corner, and the fuel saving effect can be achieved. The gear position switching operation of the multi-power switch is performed in advance, which can ensure to switch to the gear position required for passing the corner before or when entering the corner, so as to achieve a more accurate energy-saving effect.

The above are only embodiments of the present disclosure, and do not therefore limit the protection scope of the present disclosure. Any equivalent transformation made by using the contents of the specification of the present disclosure and the accompany drawings, or direct or indirect application in the relevant technical field is similarly included in the protection scope of the patent disclosure.

The invention claimed is:

1. A vehicle energy saving control method, comprising:
obtaining a load threshold corresponding to each gear position of a multi-power switch;
obtaining an actual load value by a load sensor when a vehicle starts;
determining a corresponding gear position according to the actual load value and the load threshold, and switching the multi-power switch to the corresponding gear position;
obtaining road information ahead of the vehicle when the vehicle is driving, wherein the road information comprises a curvature radius of a corner ahead of the vehicle;
calculating equivalent mass according to the curvature radius, total mass of the vehicle, a speed of the vehicle and a preset road friction coefficient;
determining a predicted gear position according to a sum of the actual load value and the equivalent mass; and
switching the multi-power switch to the predicted gear position when-if the predicted gear position is different from a current gear position;
wherein the step of calculating equivalent mass according to the curvature radius, total mass of the vehicle, a speed of the vehicle and a preset road friction coefficient comprises:
calculating the equivalent mass according to a first formula, wherein the first formula is $\Delta m=(mv^2)/(g\mu r)$, $\Delta m$ is the equivalent mass, m is the total mass of the vehicle, v is the speed of the vehicle, g is a gravity angular velocity, p is the preset road friction coefficient, and r is the curvature radius of the corner ahead of the vehicle.

2. The vehicle energy saving control method according to claim 1, wherein the step of determining a corresponding gear position according to the actual load value and the load threshold, and switching the multi-power switch to the corresponding gear position comprises:
comparing, by a power transfer switch controller, the actual load value with a load threshold value, so as to determine the gear position corresponding to the actual load value, and to send the corresponding gear position to an engine engine control unit (ECU); and
switching the multi-power switch to the corresponding gear position after the corresponding gear position is received by the engine ECU.

3. The vehicle energy saving control method according to claim 1, wherein the step of obtaining road information ahead of the vehicle comprises:
obtaining a current position of the vehicle through a positioning system; and
obtaining the road information ahead of the vehicle through a navigation map or an electronic horizon system based on the current position of the vehicle.

4. The vehicle energy saving control method according to claim 1, wherein a real-time distance between a current position of the vehicle and the corner ahead is obtained in real time, and a first distance is calculated in real time according to a real-time speed of the vehicle and power gear position switching time; and
when the real-time distance and the first distance corresponding to a same time are equal, taking the real-time speed of the vehicle at the same time as the speed of the vehicle v in the first formula.

5. The vehicle energy saving control method according to claim 1, wherein the step of switching the multi-power switch to the predicted gear position comprises:
when a real-time distance between a current position of the vehicle and the corner ahead is equal to a first distance, switching the multi-power switch to the predicted gear position, wherein the first distance is calculated according to a second formula which is S=vT, wherein S is the first distance, v is a real-time speed of the vehicle, and T is power gear position switching time.

6. A non-transitory computer readable storage medium having a computer program stored thereon, wherein the computer program, when executed by a processor, implements the steps of the method according to claim 1.

7. A vehicle control system, wherein the vehicle control system comprises a power transfer switch controller, an engine engine control unit (ECU), a load sensor and a map module, wherein the map module is an electronic horizon system or a navigation map, the power transfer switch controller is connected with the engine ECU, the load sensor and the map module respectively, and the power transfer switch controller has a computer program stored thereon, wherein the computer program, when executed by a processor, implements the steps of the method according to claim 1.

* * * * *